United States Patent [19]

Zerle et al.

[11] 4,325,897
[45] Apr. 20, 1982

[54] METHOD AND APPARATUS FOR CONTROLLING SIZE OF EXTRUDED TUBE

[76] Inventors: Ludwig Zerle, Paarstr. 2, 8905 Mering; Klaus Scharm, Rossinistr. 12, 8900 Augsburg, both of Fed. Rep. of Germany

[21] Appl. No.: 148,970

[22] Filed: May 12, 1980

[30] Foreign Application Priority Data

May 15, 1979 [DE] Fed. Rep. of Germany ....... 2919472

[51] Int. Cl.³ ............................................. B29D 7/02
[52] U.S. Cl. .................................. 264/40.3; 264/40.2; 264/564; 425/140; 425/326.1
[58] Field of Search .................... 264/40.3, 40.7, 564, 264/40.2; 425/140, 149, 326.1

[56] References Cited

U.S. PATENT DOCUMENTS

| 3,092,874 | 6/1963 | Fallwell | 264/40.3 |
| 3,341,888 | 9/1967 | Bridge et al. | 264/40.3 X |
| 3,368,007 | 2/1968 | Palmer | 264/564 X |
| 4,003,972 | 1/1977 | Herz | 264/40.3 |
| 4,189,288 | 2/1980 | Halter | 264/40.3 X |

FOREIGN PATENT DOCUMENTS

| 1141775 | 12/1962 | Fed. Rep. of Germany . |
| 1504665 | 9/1969 | Fed. Rep. of Germany . |
| 1704573 | 2/1972 | Fed. Rep. of Germany . |
| 2901505 | 7/1979 | Fed. Rep. of Germany ..... 264/40.3 |
| 519335 | 7/1976 | U.S.S.R. ........................... 264/40.3 |

Primary Examiner—Philip Anderson
Attorney, Agent, or Firm—Karl F. Ross

[57] ABSTRACT

An assembly at an extruder for controlling the width of a two-layer web flattened from a tube extruded from a rotating or oscillating head of the extruder comprises monitors for detecting the velocity and edge-positions of the web upon transport thereof away from the extruder. A control circuit calculates the deviation of the actual web width from a predetermined width and emits a correction signal relayed via a stationary infrared-radiation transmitter and a receiver on the extruder head to valves controlling the pressurization of the extruded tube by a blower also mounted on the extruder head.

13 Claims, 4 Drawing Figures

METHOD AND APPARATUS FOR CONTROLLING SIZE OF EXTRUDED TUBE

FIELD OF THE INVENTION

Our present invention relates to the extrusion of foil tubes. In particular, our present invention relates to a method and an apparatus for controlling the diameter of extruded foil tubes to be subsequently converted, for example, into bags having a predetermined width.

BACKGROUND OF THE INVENTION

In the production of extruded foil tubes it is necessary to use extruders with rotating or oscillating heads to ensure that the extruded tube is of uniform wall thickness and, thus, uniform strength. A further requirement is pressurizing the tube to form a bubble therefrom at the mouth of the extruder, the size of the bubble determining the diameter of the tube. Generally, upon cooling of the portion of the tube which forms the bubble, this cooling being at least partially implemented with the aid of an external air source blowing air on the outside of the bubble, the tube is collapsed therefrom to form a folded, flattened tube or two-ply web which is transported away from the extruder station for further working, such as cutting and heating to form bags.

Owing to the motion of the extruder head, the feeding of air to the tube is particularly problematical. Air losses from the tube are, in most cases, slight or marginal, it only being necessary to occasionally feed air to or draw it from the tube. In other cases, such as when the tube is extruded with integral fasteners (e.g. of the zip-lock type), continuous large air losses arise in the bubble. In these cases an air-loss compensation must be finely and continuously implemented.

In a known extruder assembly an annular channel or ring fastened to the extruder head engages another ring fixed to the extruder body, this ring being connected to a stationary air-supply system including a blower. The head is provided with an outlet communicating with the inside of the tube and with an air chamber formed by the pair of rings and charged with air from the blower. Because of the difficulty of obtaining a satisfactory seal between the two rings, air losses in a system of this sort are high. The length of the air supply line, together with the leaking air chamber, render the system sluggish and unresponsive to changes in power output of the blower, whereby a fine control of tube pressure is difficult to attain. Further disadvantages include bulkiness due to the at least partially overlapping rings and an exhorbitant power draw for the blower due to the large air losses in the system.

OBJECTS OF THE INVENTION

An object of our present invention is to provide an assembly at an extruder of the above-mentioned type, which is accurate and responsive in correcting tube-width deviations from a predetermined standard width.

Another object of our present invention is to provide such a tube-width control assembly which occupies relatively little space.

Yet another object is to provide an improved method, implementable by such a control assembly, for producing a flattened tube or web of predetermined width.

SUMMARY OF THE INVENTION

At an extruder an assembly for producing a two-layer web or flattened tube of predetermined width comprises, according to our present invention, an at least partially rotatable head on the extruder, this head having a mouth for extruding a foil tube of substantially uniform or constant wall thickness. An air-flow or pneumatic circuit on the extruder head includes a blower and at least one valve for pressurizing the tube to shape at least a portion thereof into a bubble form at the extruder mouth. The tube is received and transported by a carrier or guide away from the extruder upon the collapse of the bubble to form a two-layer web. A monitor juxtaposed to the guide detects the width of the web and emits an electrical signal varying as a function of web width, particularly as a function of the deviation of the actual web width from the predetermined standard width. A signal generator including a transmitter stationary with respect to the extruder and connected to the monitor generates in response to the electrical signal therefrom a correction signal emitted toward the extruder head, while a receiver secured thereto and operatively connected to the pneumatic circuit controls, in response to the correction signal, the pressurization of the tube by this circuit. It is to be noted that the communications link between the transmitter and the receiver is connectionless and may be implemented, for example, by ultrasonic waves. However, we have found infrared radiation to be especially reliable and efficient. Because an infrared-wave transmitter generally has a broad angle of radiation, it may be necessary to provide only one receiver on the extruder head; such a single receiver is sufficient in situations where the extruder is located within an enclosed space surrounded wholly or in part by infrared-radiation reflectors. Otherwise, two receivers mounted on diametrically opposed sides of the extruder head are recommended.

A tube-width control assembly according to our present invention is compact, responsive and accurate. The air transmission channels are short and no extraordinary pressure seals are necessary; the pressure losses in the air-supply system are minimal. The blower may be small and requires relatively little energy. There are no mechanical contacts which necessitate constant upkeep owing to wear. Fine corrections of tube width are possible within brief time intervals.

According to another feature of our present invention, the monitor includes a pair of edge detectors stationary with respect to the extruder body and disposed at opposite edges of the web during transport thereof by the carrier. An electrical control circuit is connected to the detectors and to the transmitter for emitting the electrical width-dependent signal thereto in response to edge-position signals generated by the detectors. A velocity detector juxtaposable to the web is connected to the control circuit for emitting a signal thereto indicating the transport speed of the web, whereby the correction signal is modulated according to web velocity. Such a dependence of the width-correction signal on web velocity increases the accuracy of compensation for deviations from the predetermined standard web width.

According to further features of our present invention, the signal receiver on the head includes an additional electrical circuit inserted before the pneumatic circuit for decoding the correction signal to produce valve-control signals. The additional electrical circuit may be connected to the blower for varying the power output thereof. Generally, the head may include a heating element, the additional electrical circuit and the blower being connected to the power source supplying the heating element.

Pursuant to one of two alternative features of our present invention, the pneumatic circuit includes a conduit extending from the blower to an outlet on the head and a pressure-regulating valve inserted between the blower and the conduit outlet, this valve being connected to the signal receiver for varying the air flow through the conduit according to the correction signal; the conduit advantageously includes an expansion chamber and an adjustable throttle valve.

Pursuant to the second alternative feature, the pneumatic circuit includes an air-flow line extending between an input and an output of the blower. The line has an outlet communicating with the atmosphere and connected to the blower output via a first valve, an inlet communicating with the atmosphere and connected to the blower input via a second valve, and an inflow port communicating with the tube and connected to the blower output via a third valve and to the blower input via a fourth valve. The signal receiver is connected to the valves for opening and closing pairs of them to gate air into or out of the bubble. Such a circular pneumatic circuit has exceedingly small pressure losses and is especially responsive in correcting web-width deviations. The valves are advantageously of the spring-loaded electromagnetic type and can be very light in weight.

A method for producing a two-layer foil strip of predetermined width comprises, according to our present invention, the steps of extruding, from an at least partially rotatable (i.e. rotatable or oscillatable) extruder head, a foil tube or substantially uniform wall thickness; pressurizing, by means of a blower and at least one valve on the head, the tube to form at least a portion thereof into a bubble; collapsing the tube from the bubble to form a two-layer web; transporting the web away from the extruder; monitoring the parallel edges of the web to determine an actual width thereof; generating a width-correction signal as a function of the divergence between the actual web width and the predermined width; transmitting the width-correction signal via an electromagnetic link to a receiver on the head; and adjusting, according to the electromagnetically transmitted width-correction signal, the pressurization of the tube by the blower and the valve. In addition, the transport speed of the web may be monitored, the width-correction signal being generated also as a function of web velocity.

BRIEF DESCRIPTION OF THE DRAWING

These and other features and advantages of our present invention will now be described in detail, reference being made to the accompanying drawing in which.

SPECIFIC DESCRIPTION

Figure 1:
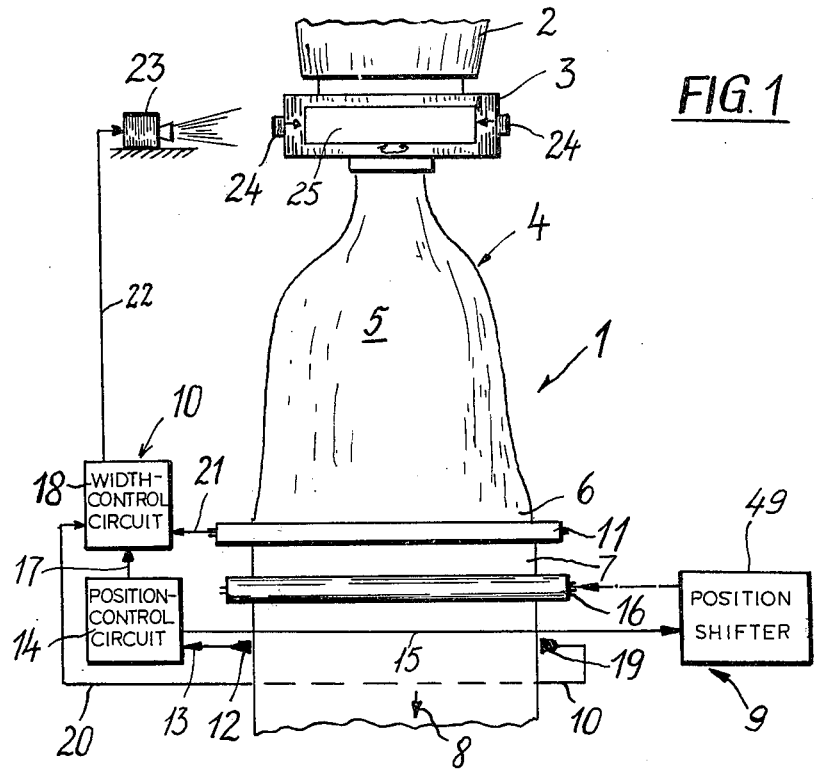
FIG. 1 is a diagram, partly in block form, of a web- or tube-width control assembly according to our present invention, showing a rotatable or oscillatable extruder head carrying a pneumatic circuit for pressurizing an extruded tube.

As shown in FIG. 1, an assembly 1 at an extruder 2 for producing a foil tube 4 comprises an extruder head 3 which is rotatable or pivotable to ensure that the tube 4 issuing from a mouth or outlet 3' of the extruder head has a uniform wall thickness. According to our present invention, a blower 29 or 29A and air-flow control valves 30–33 or 42, 45 (FIGS. 2–4) are mounted on extruder head 3 for pressurizing tube 4 to form from at least a portion thereof a bubble 5 to enable proper cooling of the tube. Bubble 5 collapses or is squeezed together at 6 to form a two-layer web or plastic strip 7 which is transported away from extruder 2 in the direction of an arrow 8 by a conveyor or carrier 9.

This carrier includes a feed or transport roller 16 whose longitudinal position, i.e. position perpendicular to the direction 8 of web motion, is adjustable by a servomechanism 49 in response to signals emitted over a lead 15 by a position-control circuit 14. This circuit is connected via a lead 13 to an edge detector or sensor 12, preferably of the photoelectric type, juxtaposed to an edge of web 7. Circuit 14 may compare the magnitude of a signal from detector 12 with a reference voltage corresponding to a predetermined position of web 7 in a direction perpendicular to the direction 8 of web transport, an error signal being generated on lead 15 for inducing servomechanism 49 to shift roller 16 to compensate changes in the position of web 7.

Circuit 14 has output lead 17 working into a control circuit 18 which has another input lead 20 extending from an edge detector 19 disposed at an edge of web 7 opposite sensor 12 and yet another input lead 21 extending from a velocity detector 11 juxtaposed to web for monitoring the transport speed thereof. Detector 11 may take the form of a roller cooperating with a magnetic pickup to emit a pulse train with a frequency proportional to the speed of web transport.

In response to signals from edge detectors 12, 19 together indicating the width of web 7 and in response to a velocity-coding signal from detector 11, circuit 18 transmits to an infrared-radiation transmitter 23 via a lead 22 a signal coding the discrepancy between the actual width of web 7 and a pre-established standard, modulated or varied according to the speed of the web. This signal constitutes a correction signal and is relayed or encoded and transmitted by radiator 23 to an infrared-radiation receiver 24, or preferably a plurality of such receivers, secured to extruder head 3. These receivers convert arriving infrared electromagnetic waves into electrical signals carried by leads 50 to a decoding and switching circuit 28 (see FIG. 2) mounted on head 3 together with valves 30–33 and blower 29.

Figure 3:
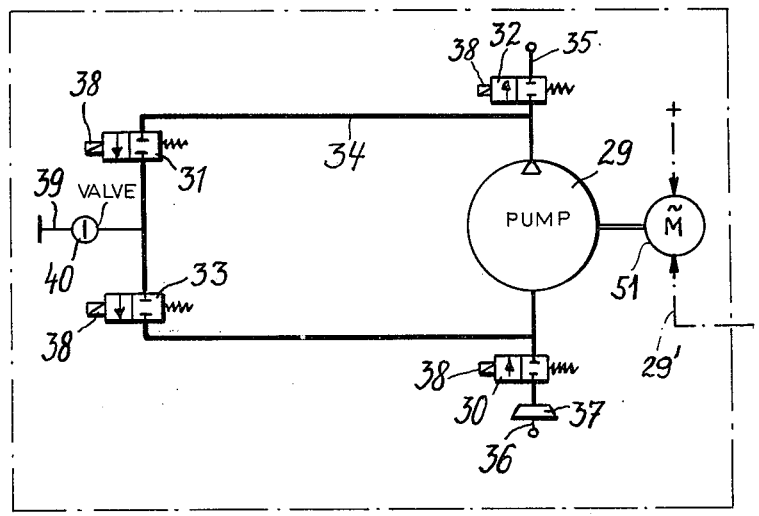
FIG. 3 is a diagram of the pneumatic circuit carried by the extruder head of FIG. 1.

As illustrated in FIG. 3, blower 29 is inserted in a generally circular pneumatic circuit or line 34 provided with an outlet 35 and an inlet 36 communicating with the atmosphere and coupled to an output side and an input side, respectively, of blower 29 via valves 32 and 30. Line 34 has another outlet 39 communicating with the inside of tube 4 and provided with a gate-type shutoff valve 40 which may be manually adjusted for damping the air flow into bubble 5 from air line or conduit 34. Outlet 39 is flanked in line 34 on an upstream side by valve 31 and on a downstream side by valve 33. An air filter 37 is included at inlet 36.

Figure 2:
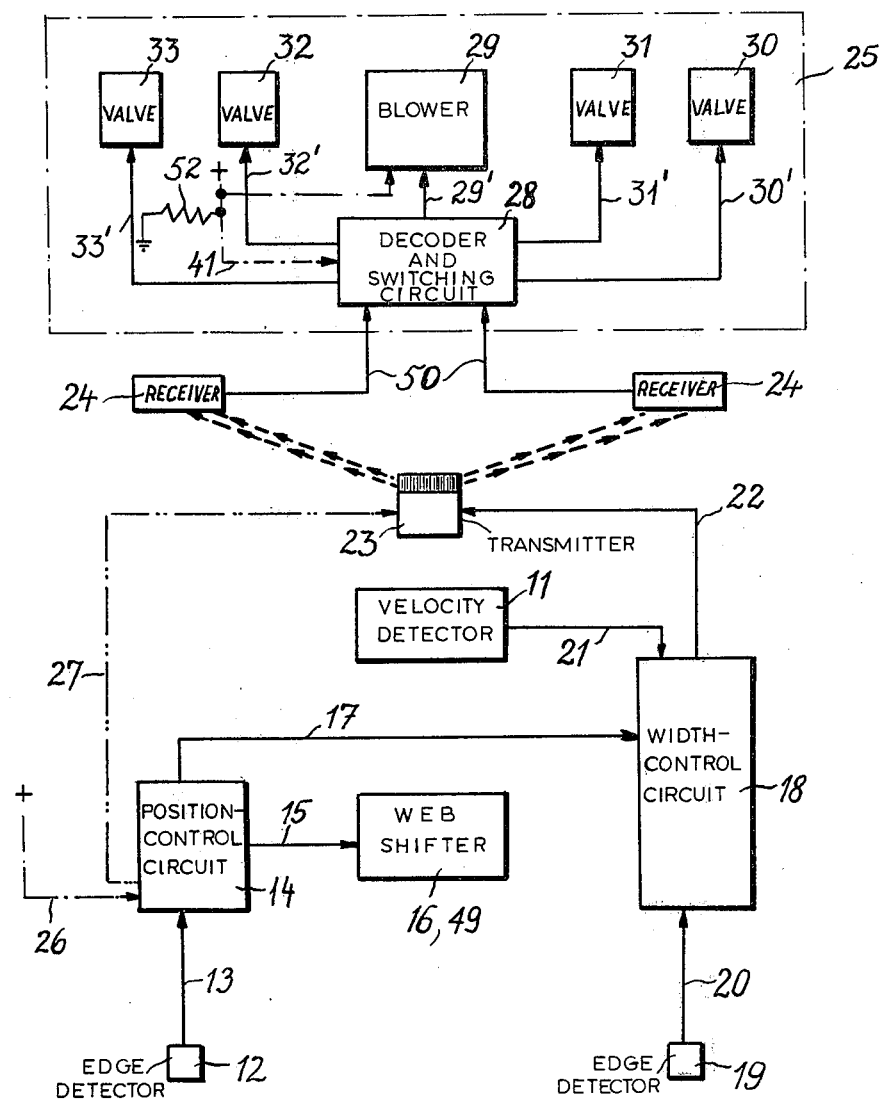
FIG. 2 is a block diagram of an electrical circuit for actuating the pneumatic circuit by the head shown in FIG. 1.

As shown in FIG. 2, switching circuit 28 has output leads 30'–33' connected to electromagnets 38 (FIG. 3) of valves 30–33 for actuating the same, i.e. for shifting the valves from a closed state to an open state. Another lead 29' extends from switching circuit 28 to a motor 51 energizing blower 29, whereby the power output thereof may be adjusted in accordance with width-correction signals received from control circuit 18 via the infrared-radiation communications link including transmitter 23 and receivers 24. Switching circuit 28 and motor 51 are tied to a power-transmission line 41 which supplied energy to a heating element or coil 52 inside extruder head 3.

If the web width calculated by control circuit 18 in response to the edge-position signals emitted by detectors 12 and 19 is less than a predetermined width, a correction signal transmitted over link 23, 24 induces switching circuit 28 to open valves 30, 31 and to close valves 32, 33, whereby air is pumped from inlet 36 to inflow-outflow port 39 to increase the size of bubble 5 and thus the width of web 7. If the calculated web width is greater than the predetermined width, valves 30, 31 are closed and valves 32, 33 are opened, according to a correction signal transmitted over link 23, 24, whereby air is sucked from bubble 5 for decreasing the width of the web. The rate at which air is blown into or sucked from bubble 5 is at least in part proportional to the transport speed of the web, such a variation of the air-flow rate being effected by circuit 18 via a modulation of the correction signal according to the frequency of the pulse train received from velocity detector 11. Preferably, the rate of air flow into bubble 5 is controlled chiefly by the frequency with which valves 30 and 31 are opened, while the rate of flow from the bubble is determined by the frequency of actuation of valves 32, 33.

As shown in FIG. 2, transmitter or radiator 23 may be supplied with power by means of a lead 27 extending from position-control circuit 14 which in turn is connected to a voltage source via a lead 26. It is to be noted that transmitter 23 is stationary with respect to extruder 2, while the two receivers 24 are preferably mounted on diametrically opposed sides of extruder head 3.

Figure 4:
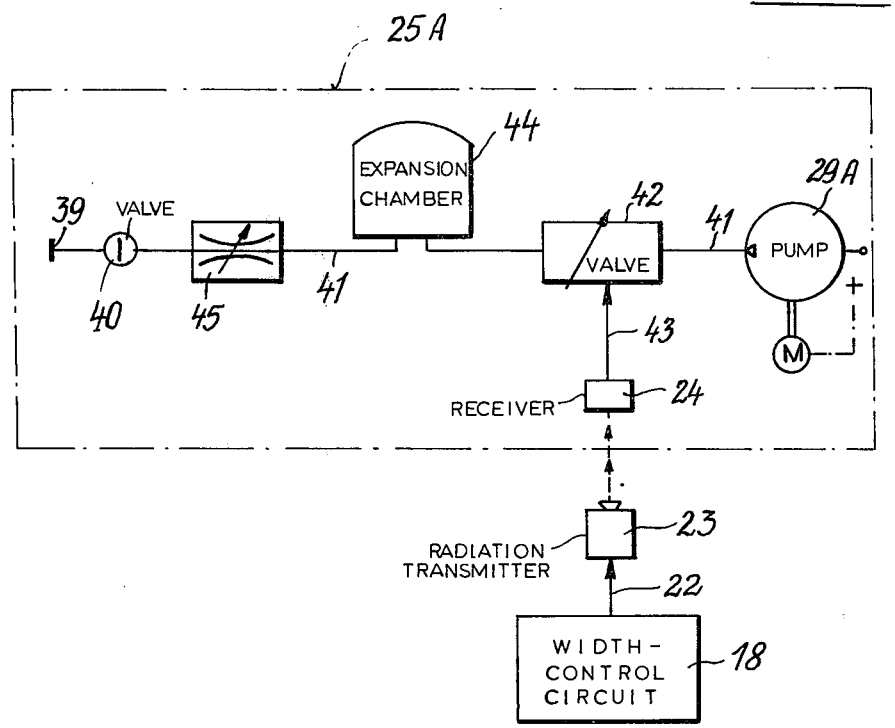
FIG. 4 is a diagram of an alternative embodiment of the pneumatic circuit of FIG. 3.

If tube 4 is to be extruded with integral fasteners, e.g. of the zip-lock type, it is advantageous to use an air-flow control assembly 25A shown in FIG. 4, rather than an assembly 25 comprising valves 30–33 and blower 29 and heretofore described with reference to FIGS. 2 and 3. Assembly 25A includes a pressure-regulating valve 42, a pressure compensating or expansion chamber 44, an adjustable throttle or choking valve 45 and gate-type shut-off valve 40 inserted in a line or conduit 41 extending from blower 29A to outlet 39. It is clear that valves 40, 42 and 45 control the magnitude of air flow toward connection 39 but are not able to reverse the direction of the flow. Valve 42 is anticipatorily controlled, preferably step-wise rather than continuously, by width-control circuit 18 via link 22, 23, 24 and a lead 43 connected between receiver or receivers 23 and valve 42. Expansion chamber 44 compensates possible pressure oscillations, while throttle valve 45 provides an additional fine adjustment of the air flow to bubble 5.

We claim:

1. A method for producing a foil strip of predetermined width, comprising the steps of:

extruding, from an at least partially rotatable extruder head, a foil tube of substantially uniform wall thickness;

pressurizing, by means of a blower and at least one valve attached to said head, said tube to form from at least a portion thereof a bubble;

collapsing said tube from said bubble to produce a two-layer web;

transporting said web away from said extruder head;

monitoring parallel edges of said web to determine an actual width thereof;

generating an electromagnetic width-correction signal as a function of the divergence between said actual width and said predetermined width;

wirelessly transmitting said width-correction signal to a receiver on said head; and adjusting, according to the wirelessly transmitted width-correction signal, the pressurization of said tube by said blower and said valve.

2. The method defined in claim 1, further comprising the step of monitoring the transport speed of said web, said width-correction signal being generated as a function of the transport speed of said web and as a function of the divergence between said actual width and said predetermined width.

3. The method defined in claim 1 or 2 wherein said width-correction signal is in the form of infrared radiation.

4. At an extruder, in combination:

an at least partially rotatable head on said extruder, said head having a mouth for extruding a foil tube of substantially uniform wall thickness;

air-flow means on said head for pressurizing said tube to shape at least a portion thereof into a bubble from at said mouth, said air-flow means including a blower and at least one valve;

guide means juxtaposed to said head for receiving said tube upon a collapse thereof from said bubble form to a two-layer web and for transporting said web from said extruder;

monitor means juxtaposed to said guide means for detecting the width of said web upon transport thereof by said guide means and for emitting an electrical signal varying as a function of said width;

signal-generating means including a transmitter stationary with respect to said extruder and connected to said monitor means for generating in response to said electrical signal a wireless correction signal in the form of electromagnetic radiation emitted toward said head; and signal-receiving means including a receiver secured to said head and operatively connected to said air-flow means for controlling, in response to said correction signal, the pressurization of said tube by said air-flow means.

5. The combination defined in claim 4 wherein said radiation has a frequency in the infrared portion of the electromagnetic spectrum.

6. The combination defined in claim 5 wherein said monitor means includes a pair of edge detectors stationary with respect to said extruder and disposed at opposite edges of said web during transport thereof by said guide means, said monitor means further including control circuit means connected to said detectors and to said transmitter for emitting said electrical signal thereto in response to edge-position signals generated by said detectors.

7. The combination defined in claim 6, further comprising a velocity detector juxtaposed to said web and connected to said circuit means for emitting a signal thereto indicating the speed of said web, whereby said correction signal is modulated according to web velocity.

8. The combination defined in claim 7 wherein said signal-receiving means includes electrical circuit means inserted between said receiver and said air-flow means for decoding said correction signals to produce valve-control signals.

9. The combination defined in claim 8 wherein said electrical circuit means is operatively connected to said blower for varying the power output thereof.

10. The combination defined in claim 8 or 9 wherein said head includes a heating element, said electrical circuit means and said blower being connected to the power source supplying said element.

11. The combination defined in claim 4, 5, 6 or 7 wherein said air-flow means includes a conduit extending from said blower to an outlet on said head and a pressure-regulating valve inserted in said conduit between said blower and said outlet, said pressure-regulating valve being connected to said receiver for varying the air flow through said conduit according to said correction signal.

12. The combination defined in claim 11 wherein said air-flow means further includes an expansion chamber and an adjustable throttle valve inserted in said conduit.

13. The combination defined in claim 4, 5, 6, 7, 8 or 9 wherein said air-flow means includes an air-flow line extending between an input and an output of said blower, said line having an outlet communicating with the atmosphere and connected to said output via a first valve, an inlet communicating with the atmosphere and connected to said input via a second valve, and an inflow-outflow port communicating with said tube and connected to said output via a third valve and to said input via a fourth valve, said signal-receiving means being coupled to said valves for opening said second and said third valve and closing said first and said fourth valve to channel air into said tube and for opening said first and said fourth valve and closing said second and said third valve to draw air from said tube.

* * * * *